(12) United States Patent
Park

(10) Patent No.: US 7,160,169 B2
(45) Date of Patent: Jan. 9, 2007

(54) METHOD OF FORMING CARBON NANOTUBE EMITTERS AND FIELD EMISSION DISPLAY (FED) INCLUDING SUCH EMITTERS

(75) Inventor: Shang-Hyeun Park, Boryeong-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 247 days.

(21) Appl. No.: 10/979,139

(22) Filed: Nov. 3, 2004

(65) Prior Publication Data

US 2005/0112983 A1    May 26, 2005

(30) Foreign Application Priority Data

Nov. 24, 2003   (KR) .................. 10-2003-0083625

(51) Int. Cl.
*H01J 9/04* (2006.01)
(52) U.S. Cl. ..................... 445/51; 445/50; 445/49
(58) Field of Classification Search ............. 445/49–51
See application file for complete search history.

(56) References Cited

U.S. PATENT DOCUMENTS

| 6,440,763 | B1* | 8/2002 | Hsu ............................ 438/20 |
| 6,692,791 | B1* | 2/2004 | Chang et al. ................. 427/77 |
| 6,811,457 | B1* | 11/2004 | Cheng et al. ................ 445/24 |
| 6,825,595 | B1* | 11/2004 | Jin et al. .................... 313/311 |
| 6,835,591 | B1* | 12/2004 | Rueckes et al. ............. 438/99 |
| 2003/0184203 | A1* | 10/2003 | Inoue et al. ................ 313/309 |

* cited by examiner

*Primary Examiner*—Joseph Williams
*Assistant Examiner*—Dalei Dong
(74) *Attorney, Agent, or Firm*—Robert E. Bushnell, Esq.

(57) ABSTRACT

A method of forming carbon nanotube emitters and a method of manufacturing an FED using such carbon nanotube emitters includes: forming a carbon nanotube layer on a substrate on which a plurality of electrodes are formed, coating a photoresist on the carbon nanotube layer, patterning the photoresist such that the photoresist only remains above the electrodes, removing an exposed portion of the carbon nanotube layer by etching using the patterned photoresist as a etch mask, and removing the photoresist pattern and forming the carbon nanotube emitters on the electrodes.

10 Claims, 7 Drawing Sheets

METHOD OF FORMING CARBON NANOTUBE EMITTERS AND FIELD EMISSION DISPLAY (FED) INCLUDING SUCH EMITTERS

CLAIM OF PRIORITY

This application makes reference to, incorporates the same herein, and claims all benefits accruing under 35 U.S.C. §119 from my application METHOD FOR FORMING CARBON NANOTUBE EMITTER AND METHOD FOR MANUFACTURING FIELD EMISSION DISPLAY USING THE SAME filed with the Korean Industrial Property Office on 24 Nov. 2003 and there duly assigned Ser. No. 2003-83625.

BACKGROUND OF THE INVENTION

1. Field of the Invention

The present invention relates to a method of forming carbon nanotube emitters and a method of manufacturing a field emission display including such carbon nanotube emitters, and more particularly, to a method of forming impurity-free carbon nanotube emitters using a simple process and a method of manufacturing a Field Emission Display (FED) device including such carbon nanotube emitters.

2. Description of the Related Art

Typical applications of display devices as important information transfer media include monitors for personal computers and television screens. The display devices include Cathode Ray Tubes (CRTs) which use thermionic emission at high speed and flat panel displays. Flat panel displays include Liquid Crystal Displays (LCDs), Plasma Display Panels (PDPs), and Field Emission Displays (FEDs).

An FED is a display device in which electrons are emitted from a field emitter arranged at regular intervals on a cathode electrode by forming a strong electric field between the field emitter and a gate electrode and light is radiated when electrons collide with a fluorescent material of an anode electrode.

A micro-tip formed of a metal such as Molybdenum (Mo) is widely used as the field emitter. However, Carbon Nanotube (CNT) emitters are now being used. Since an FED using CNT emitters has advantages including a wide viewing angle, a high resolution, a low power consumption, and temperature stability, FEDs using CNT emitters are very suitable for car navigation devices or viewfinders for electronic image display devices. Also, an FED using CNT emitters can be used as a replaceable display device for a personal computer, a Personal Data Assistant (PDA), a medical apparatus, or a high definition television. It can also be used as a backlight for an LCD.

There are two methods of forming a CNT emitter. A first method forms the CNT emitter by growing the CNT on a substrate, and a second method forms the emitter mechanically by making a CNT paste.

When using the first method, it is difficult to form a large device because the CNT must be grown on a substrate. Also, when glass is used as the substrate, a high temperature can become a problem depending on the method of growing.

On the other hand, when using the second method, an impurity such as a binder, a resin, or a filler can be included in the pure carbon nanotubes during forming the emitter mechanically. It is known that the impurity negatively affects the lifetime and stability of the carbon nanotube emitter. Also, a number of defects during a purifying process of the carbon nanotubes can occur. These defects can also reduce the lifetime of the carbon nanotube.

SUMMARY OF THE INVENTION

To solve the above and other problems, the present invention provides a method of manufacturing impurity-free carbon nanotube emitters using a simple process and a method of manufacturing an FED device including such nanotube emitters.

According to an aspect of the present invention, a method of manufacturing carbon nanotube emitters is provided, the method including: forming a carbon nanotube layer on a substrate on which a plurality of electrodes has been formed; coating a photoresist on the carbon nanotube layer; patterning the photoresist such that the photoresist only remains above the electrodes; removing an exposed portion of the carbon nanotube layer by etching using the patterned photoresist as an etch mask; and removing the patterned photoresist and forming the carbon nanotube emitters on the electrodes.

The carbon nanotube layer can be formed by coating a mixture of solvent and carbon nanotubes on the electrodes and the substrate.

The mixture of solvent and carbon nanotubes can be coated by either a spin coating method or a table coating method.

The carbon nanotube layer can be etched by a reaction ion etching method or by plasma processing under an oxygen atmosphere.

According to another aspect of the present invention, a method of manufacturing an FED device is provided, the method including: sequentially forming a cathode, an insulating layer, and a gate electrode on a substrate; forming an emitter aperture exposing a portion of the cathode by etching the insulating layer and the gate electrode; forming a carbon nanotube layer on the gate electrode, the insulating layer, and the cathode; coating a photoresist on the carbon nanotube layer; patterning the photoresist such that the photoresist remains in only a central portion at the bottom of the emitter aperture; removing an exposed portion of the carbon nanotube layer by etching using the patterned photoresist as an etch mask; and removing the patterned photoresist and forming carbon nanotube emitters on the cathode in the emitter aperture.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1A:
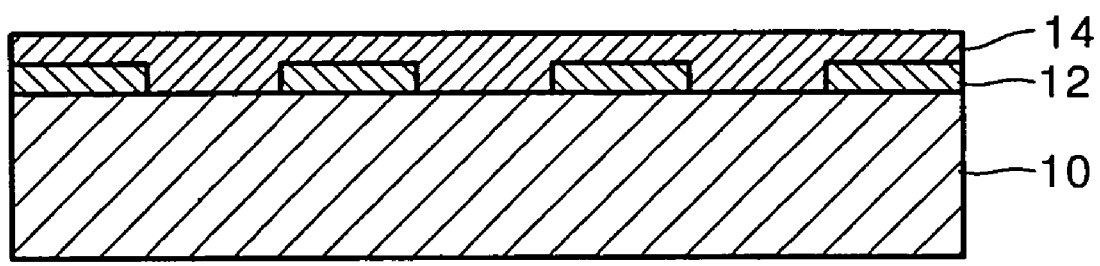
FIGS. 1A through 1E are cross-sectional views of a method of manufacturing carbon nanotube emitters according to an embodiment of the present invention.

Hereinafter, the present invention will be described more fully with reference to the accompanying drawings in which embodiments of the present invention are shown. Like reference numerals in the drawings denote like elements.

FIGS. 1A through 1E are cross-sectional views of a method of manufacturing carbon nanotube emitters according to an embodiment of the present invention.

Referring to FIG. 1A, a substrate 10 on which a plurality of electrodes 12 have been formed in a predetermined arrangement is prepared. Glass can be used as the substrate 10, and the electrodes 12 can be of a transparent conductive material such as an Indium Tin Oxide (ITO). The electrodes 12 can be formed as stripes on the substrate 10.

Figure 2A:
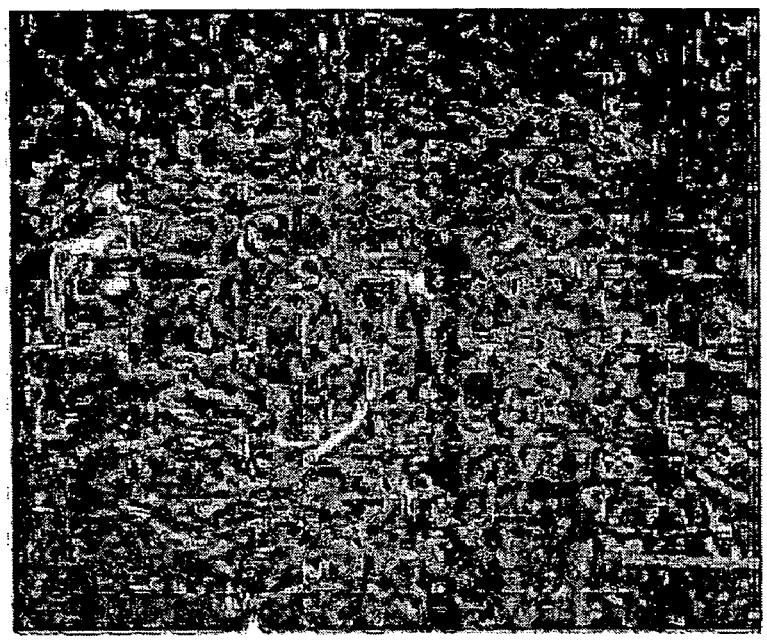
FIGS. 2A through 2C are Surface Electron Microscopy (SEM) images taken while forming the carbon nanotube emitter according to the method of FIGS. 1A through 1E.

A carbon nanotube layer 14 having a predetermined thickness is formed on the substrate 10 and the electrodes 12. More specifically, the carbon nanotube layer 14 can be formed by coating a mixture of a solvent and carbon nanotubes mixed in a 1:1 ratio on the entire surface of the substrate 10 and the electrodes 12 using a spin coating method or a table coating method. A large device can be formed using the spin coating method or the table coating method. FIG. 2A is a SEM image of the carbon nanotube layer 14 formed on the substrate 10.

Figure 1B:
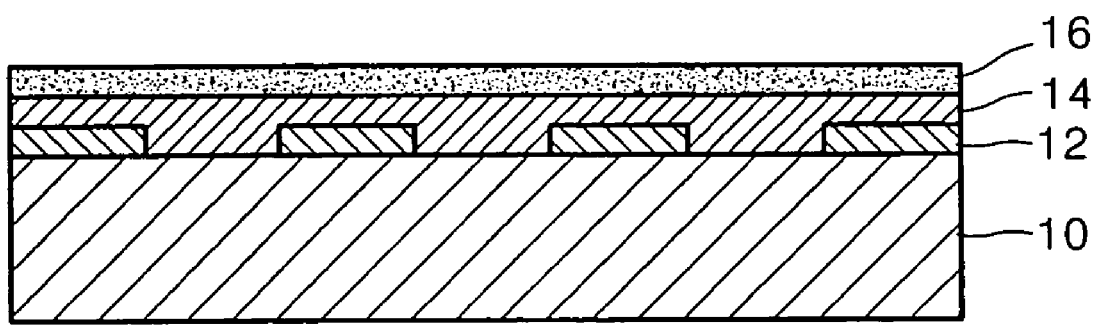
Figure 1C:
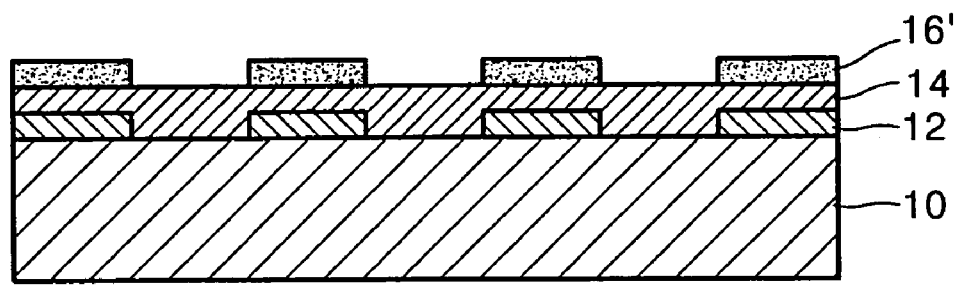
Figure 2B:

Referring to FIG. 1B, a photoresist 16 is deposited on the carbon nanotube layer 14. Referring to FIG. 1C, the photoresist 16 is patterned into a predetermined shape. As a result, a patterned photoresist 16' remains only directly above the electrodes 12. FIG. 2B is a SEM image of the patterned photoresist 16' formed on the carbon nanotube layer 14.

Figure 1D:
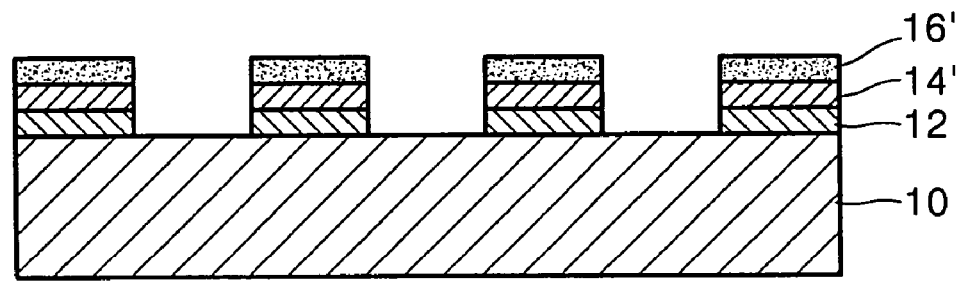

Referring to FIG. 1D, the exposed carbon nanotube layer 14 is etched using the patterned photoresist 16' as an etch mask, thereby exposing an upper surface of the substrate 10. The carbon nanaotube layer 14 can be etched using a Reactive Ion Etching method (RIE). The RIE method used to etch the carbon nanotube layer 14 can be performed by plasma processing under an oxygen atmosphere. Thus, carbon nanotube emitters 14' are formed on the electrodes 12.

Figure 1E:
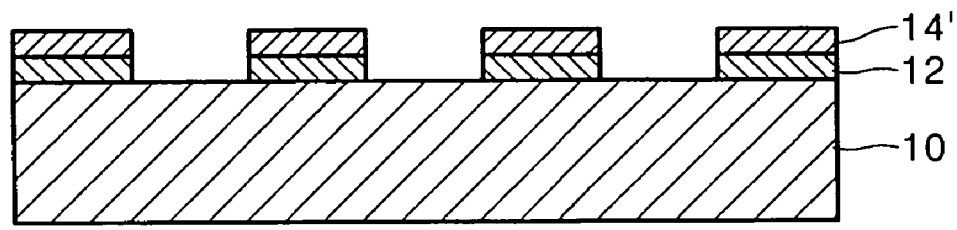
Figure 2C:
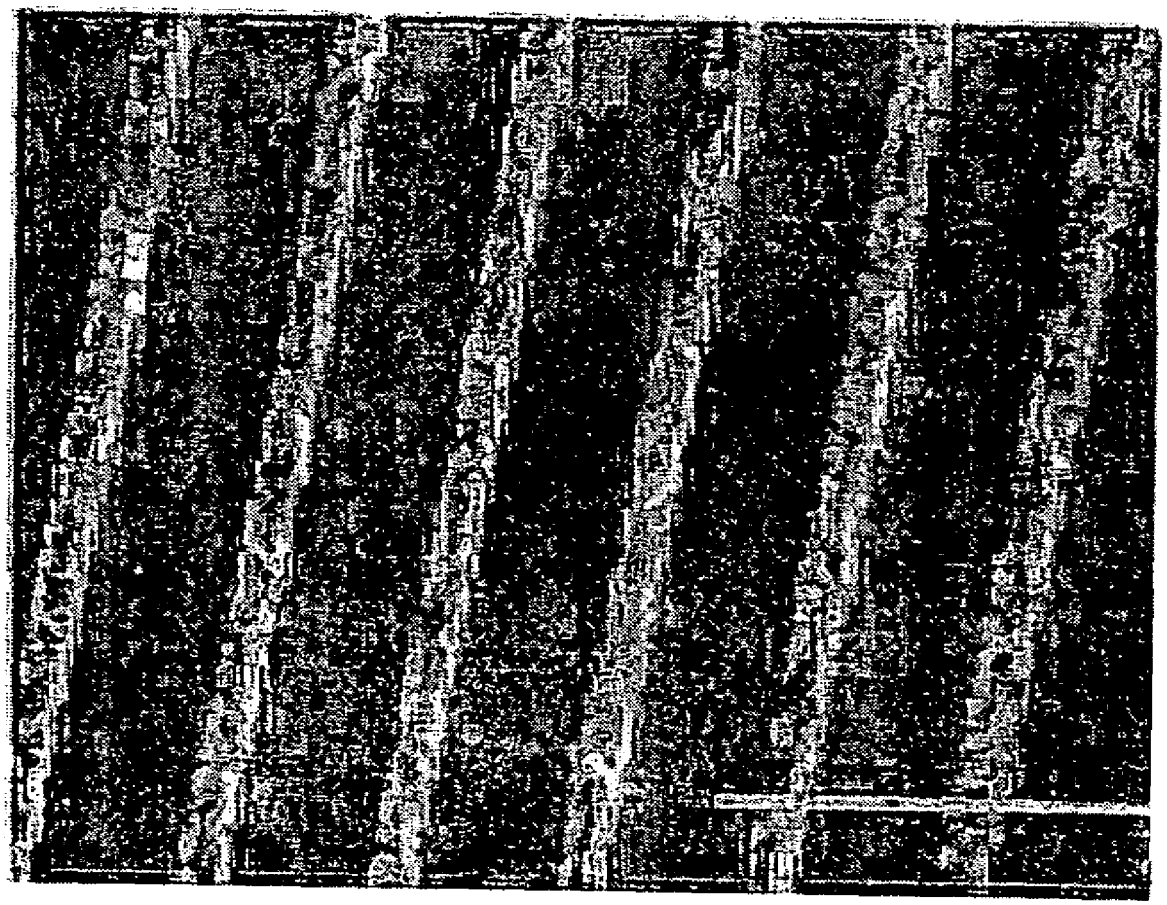

Referring to FIG. 1E, the patterned photoresist 16' is removed by a stripper such as nanostrip. As a result, only the carbon nanotube emitters 14' remain on the electrodes 12. FIG. 2C is a SEM image of the carbon nanotube emitters 14' formed on the substrate 10.

FIGS. 3A through 3F are cross-sectional views of a method of manufacturing an FED according to an embodiment of the present invention.

Figure 3A:
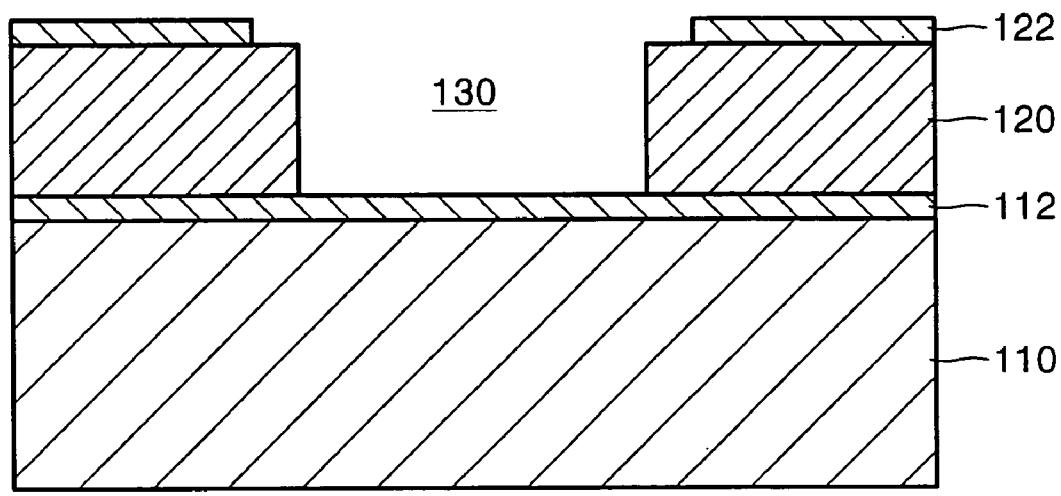
FIGS. 3A through 3F are cross-sectional views of a method of manufacturing an FED device according to an embodiment of the present invention.

Referring to FIG. 3A, after sequentially forming a cathode 112, an insulating layer 120, and a gate electrode 122 on a substrate 110, an emitter aperture 130 exposing a portion of the cathode 112 is formed by etching the insulating layer 120 and the gate electrode 122. The substrate 110 can be formed of glass. The cathode 112 can be formed of a conductive transparent material such as ITO, and the gate electrode 122 can be formed of a conductive metal such as chromium.

More specifically, the cathode 112 can be formed by patterning a cathode electrode layer into a predetermined shape, such as a stripe, after depositing the cathode layer of ITO having a predetermined thickness on the substrate 110. Then, the insulating layer 120 having a predetermined thickness is formed on the entire surface of the cathode 112 and the substrate 110. Then, a gate electrode layer is formed on the insulating layer 120. The gate electrode layer can be formed of a conductive metal having a predetermined thickness using a sputtering method, and the gate electrode 122 can be formed by patterning the gate electrode layer into a predetermined shape. Then, the emitter aperture 130 is formed by etching the exposed insulating layer 120 using the gate electrode 122 as an etch mask. As a result, a portion of the cathode 112 is exposed by the emitter aperture 130.

Figure 3B:
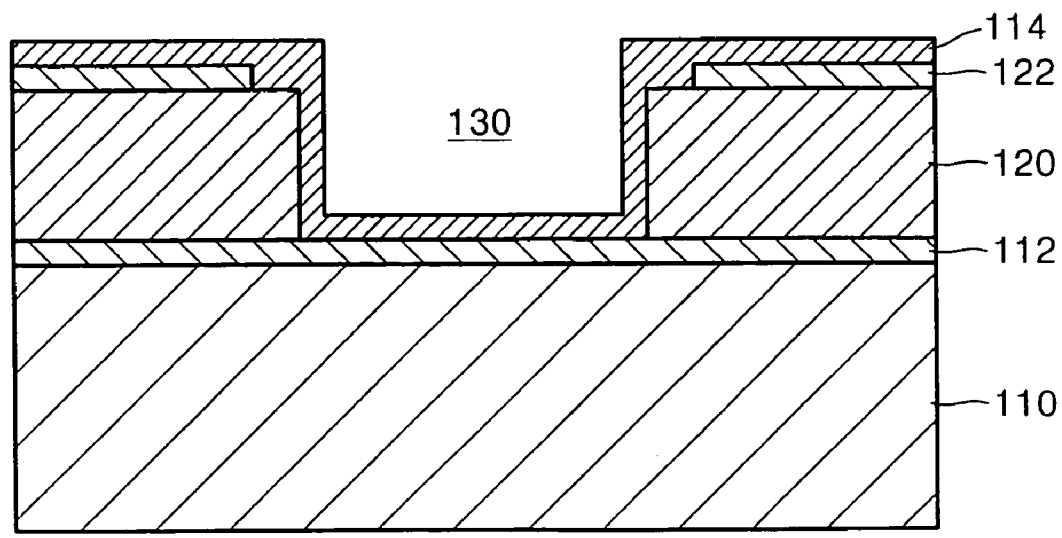

Referring to FIG. 3B, a carbon nanotube layer 114 having a predetermined thickness is formed on the resultant product in FIG. 3A. More specifically, the carbon nanotube layer 114 can be formed by coating a mixture of solvent and carbon nanotubes mixed in a 1:1 ratio on the cathode 112, the insulating layer 120, and the gate electrode 122 using a spin coating method or a table coating method.

Figure 3C:
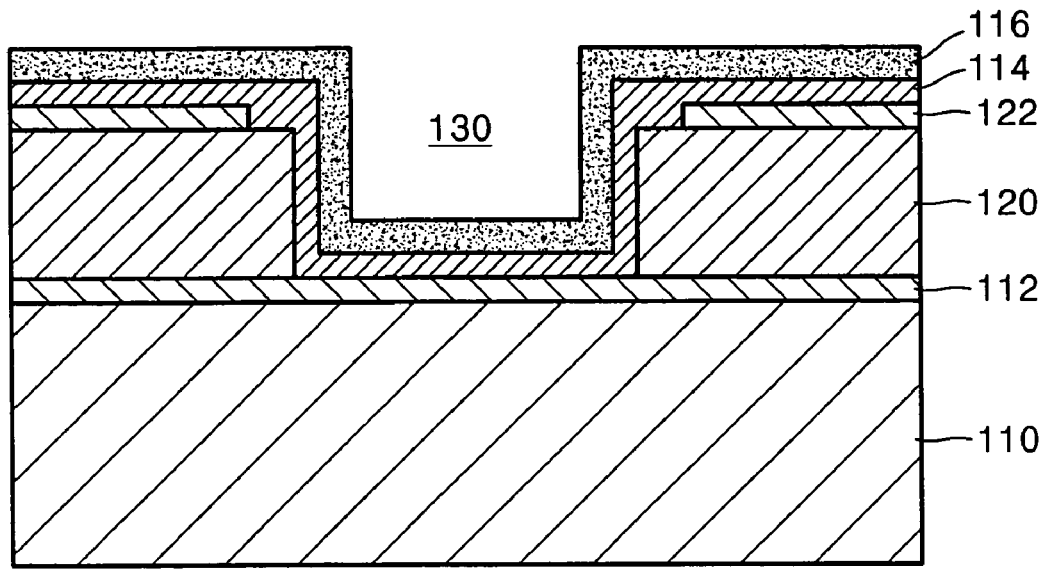
Figure 3D:
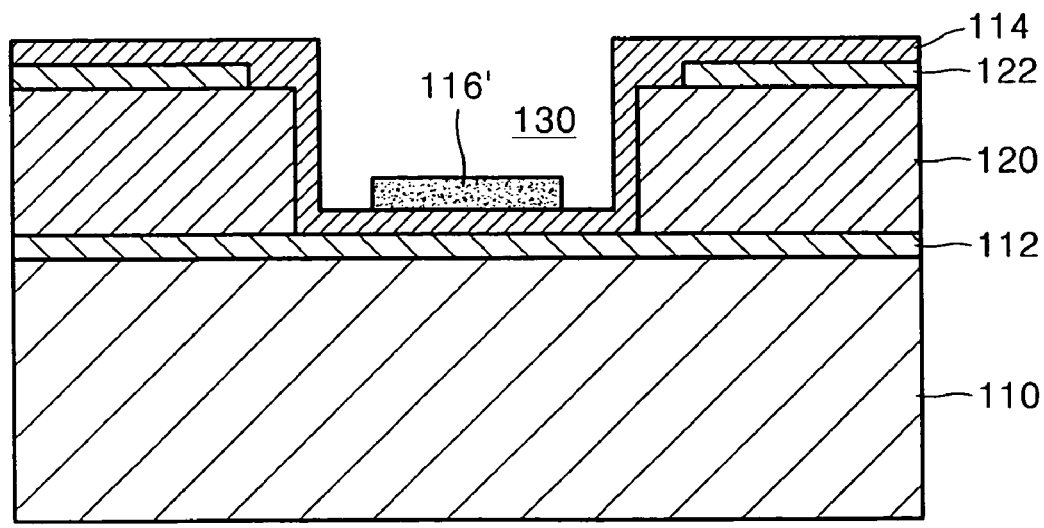

Referring to FIG. 3C, a photoresist 116 is coated on the carbon nanotube layer 114. Then, referring to FIG. 3D, the photoresist 116 is patterned into a predetermined shape. As a result, a patterned photoresist 116' remains only on a central portion of the bottom of the emitter aperture 130.

Figure 3E:
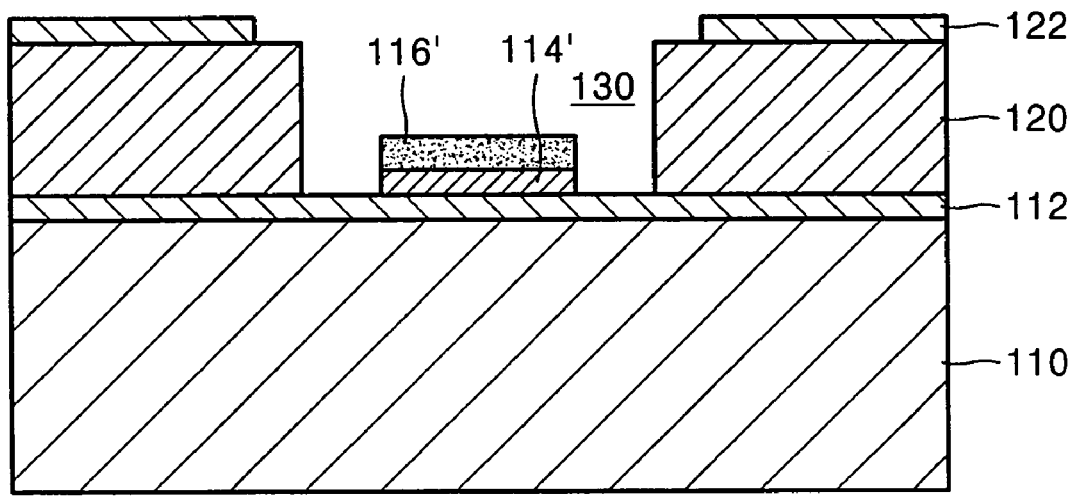

Referring to FIG. 3E, the exposed carbon nanotube layer 114 is removed by etching using the patterned photoresist 116' as an etch mask. The carbon nanotube layer 114 can be etched using an RIE method. The RIE method used to etch the carbon nanotube layer 114 can be performed by plasma processing under an oxygen atmosphere. Thus, a carbon nanotube emitter 114' is formed on the cathode 112.

Figure 3F:
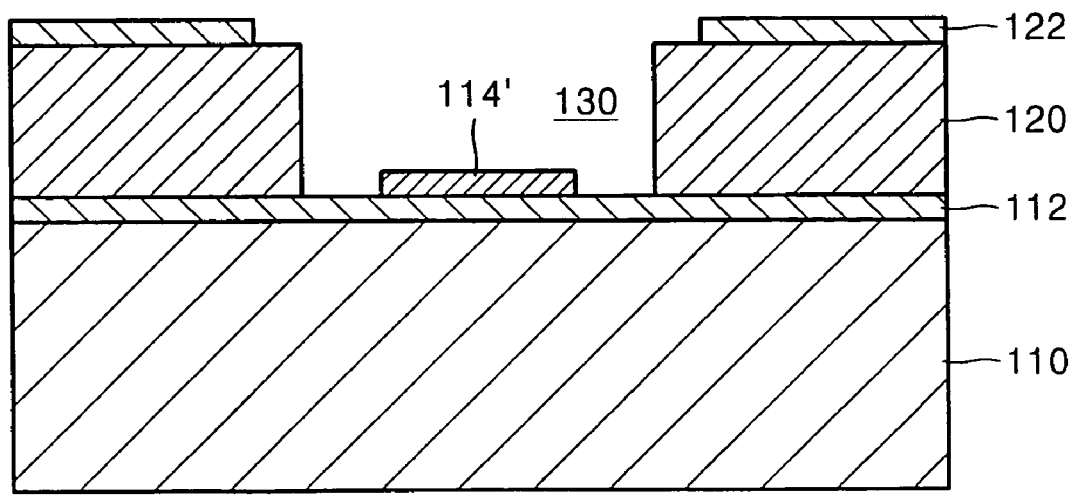

Referring to FIG. 3F, only the carbon nanotube emitter 114' remains on the cathode 112 after removing the patterned photoresist 116'.

The carbon nanotube emitter according to the present invention has the following advantages.

First, since the carbon nanotube emitter can be formed on a desired location and with a desired form, the carbon nanotube emitter can be easily applied to not only the FED but also to backlighting arrangements.

Second, defect free carbon nanotube emitters can be formed by a simple process, and forming a large display device can be achieved without a growing method.

Third, a long lifetime and stability of the carbon nanotube emitters can be achieved since an impurity is not included in the carbon nanotubes, unlike in the paste method.

Fourth, a high resolution device can be easily manufactured since a fine pattern of carbon nanotube emitters can be formed.

While this invention has been particularly shown and described with reference to exemplary embodiments thereof, it will be understood by those skilled in the art that various modifications in form and detail can be made therein without departing from the spirit and scope of the present invention as defined by the appended claims.

What is claimed is:

1. A method of manufacturing carbon nanotube emitters, the method comprising:
    forming a carbon nanotube layer on a substrate on which a plurality of electrodes are formed;
    coating a photoresist on the carbon nanotube layer;
    patterning the photoresist such that the photoresist only remains above the electrodes;
    removing an exposed portion of the carbon nanotube layer by etching using the patterned photoresist as a etch mask; and
    removing the patterned photoresist and forming the carbon nanotube emitters on the electrodes.

2. The method of claim 1, wherein the carbon nanotube layer is formed by coating a mixture of solvent and carbon nanotubes on the electrodes and the substrate.

3. The method of claim 2, wherein the mixture of solvent and carbon nanotubes is coated by either a spin coating method or a table coating method.

4. The method of claim 1, wherein the carbon nanotube layer is etched by a reaction ion etching method.

5. The method of claim 4, wherein the carbon nanotube layer is etched by plasma processing under an oxygen atmosphere.

6. A method of manufacturing a Field Emission Device (FED) comprising:

sequentially forming a cathode, an insulating layer, and a gate electrode on a substrate;

forming an emitter aperture exposing a portion of the cathode by etching the insulating layer and the gate electrode;

forming a carbon nanotube layer on the gate electrode, the insulating layer, and the cathode;

coating a photoresist on the carbon nanotube layer;

patterning the photoresist such that the photoresist remains in only a central portion at the bottom of the emitter aperture;

removing an exposed portion of the carbon nanotube layer by etching using the patterned photoresist as an etch mask; and removing the patterned photoresist and forming carbon nanotube emitters on the cathode in the emitter aperture.

7. The method of claim 6, wherein the carbon nanotube layer is formed by coating a mixture of solvent and carbon nanotubes on the entire surface of the substrate.

8. The method of claim 7, wherein the mixture of solvent and carbon nanotubes is coated by either a spin coating method or a table coating method.

9. The method of claim 6, wherein the carbon nanotube layer is etched by a reaction ion etching method.

10. The method of claim 9, wherein the carbon nanotube layer is etched by plasma processing under an oxygen atmosphere.

* * * * *